Feb. 2, 1960   W. B. DOCKSTADER ET AL   2,923,298
UNITARY NON-ADHERENT DRESSINGS
Filed Dec. 10, 1954
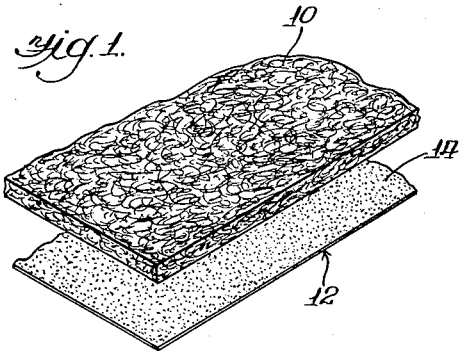
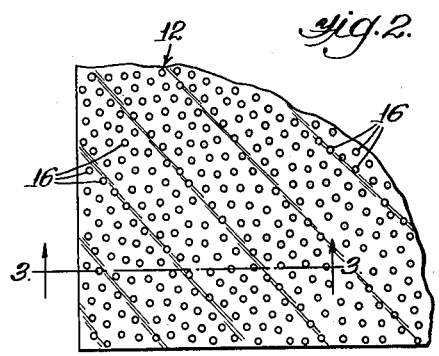
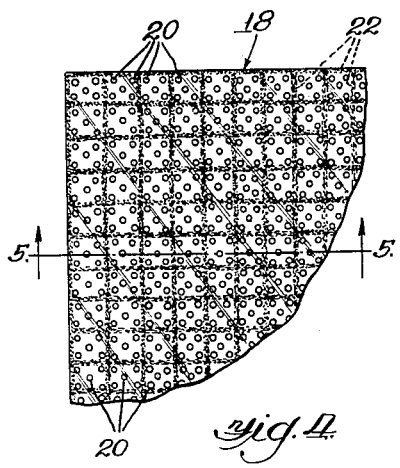
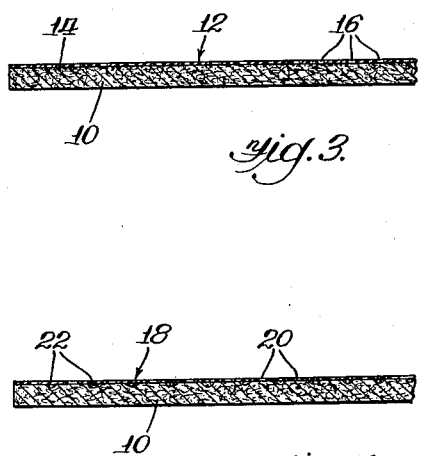
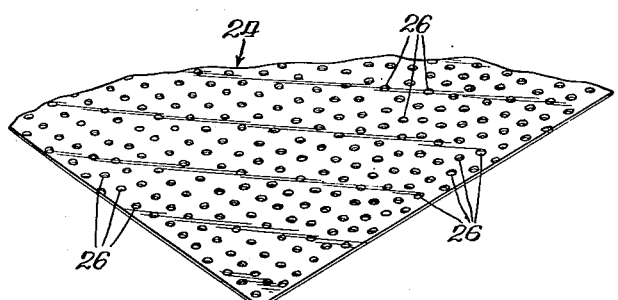
INVENTORS.
Wilmer B. Dockstader
Lawrence A. Thoennes
BY Rowland V. Patrick
Atty.

United States Patent Office 2,923,298
Patented Feb. 2, 1960

2,923,298
UNITARY NON-ADHERENT DRESSINGS

Wilmer B. Dockstader, Forest Park, and Lawrence A. Thoennes, Chicago, Ill., assignors to The Kendall Company, Boston, Mass., a corporation of Massachusetts Application December 10, 1954, Serial No. 474,571

Claims priority, application Great Britain December 1, 1954

6 Claims. (Cl. 128—296)

This invention is concerned with sterilizable surgical dressings, particularly with dressings whose normal function is the protection of wounds and the absorption of wound fluids.

The natural healing process in animals is a very complicated, little understood, process. But assuming the wound is not infected and not again injured, there is normally a healing potential which varies not only with the type of wound but with the species, the individual within the species, and in fact with the temporary state of health of the particular individual involved. Nevertheless, disposal of irreparably damaged tissue is almost invariably one of the initial phases of wound healing. The wound bleeds and weeps, washing itself in the process. Eventually this wound exudate becomes thickened and solidifies into an eschar or scab which, barring infection, normally remains in place until the wound is completely healed.

After the initial exudating stage has ceased and the eschar has formed, small delicate buds of granulating tissue begin to form—grow larger and consolidate under the eschar, at the same time preparing a bed for the forming epithelial cells. The latter spread from the peripheral edges of the wound as the bed is made ready until they also merge to force off the now useless eschar.

Unfortunately, with natural healing processes, too often the wound becomes infected with the result that very serious complications such as toxemia, septicemia, pyemia or gangrene may occur and, in any event, healing may be very much delayed.

To avoid the probability of such complications, it has been accepted practice, after disinfecting such wounds as may be contaminated to cover wounds with absorbent and protective material such as surgical gauze prior to the formation of the eschar. While such dressings have definite advantages their use admittedly detracts from the natural healing potential of the particular wounds dressed.

Ideally surgical dressing should have many properties. They should, of course, be soft and pliable initially and during use so that they will both conform to the wound and provide maximum comfort to the patient. They should present a barrier to bacterial infection. They should pad the wound to protect it from further injury. They should be easily applied and easily removed. They should be sterile and non-toxic. They should not interfere with normal wound healing. They should absorb excess fluids exuded from the wound.

It is significant that, although the properties of ideal surgical dressings have been known for many many years, no dressing as yet proposed has had all or even most of the ideal properties. The two dressings in almost universal use today, gauze and petrolatum coated gauze, have very serious well recognized deficiencies, the most serious of which, perhaps, is the difficulty with which they may be removed.

Where fibrous material such as gauze is in immediate contact with the wound, the wound exudate, a complex and largely proteinaceous adhesive material, extends into the interstices and around the fibers of the dressing so that the latter is eventually adhesively and mechanically anchored into the scabby covering. When the dressing is changed, as it frequently must be with certain types of wounds, the scabby protective covering is disrupted if not entirely removed. In other cases, particularly with certain types of wounds, such as serious burns and skin graft sites, buds of new tissue may actually grow into and around the fibrous interstices. Removal of dressings so embedded and bound is not only a most painful procedure but one which causes destruction of the delicate regenerating tissues with resultant delayed healing and often unsightly scarring. In addition, such reopening of the wound invites possible infection.

Attempts have been made, of course, to eliminate the disadvantages of plain gauze dressings but the most widely used substitute for plain gauze, petrolatum coated gauze, is messy and even though a number of layers are used, the petrolatum tends to liquefy at body temperature and soak into the dry dressing above. At the same time, such dressings tend to introduce into the wound foreign material which reacts to delay wound healing. Petrolatum coated gauze in most cases is more easily and less painfully removed than plain gauze, but it nevertheless shows, in a high percentage of cases, the same troublesome wound sticking with attendant induced capillary bleeding. Further, because such dressings absorb and transfer wound fluids poorly, they produce a wet saturated condition not conducive to rapid healing.

It is the object of this invention to provide an ideal unitary surgical dressing having a unique functionality, and superior to any other surgical dressing on the market today.

In the accompanying drawings and photographs:

Fig. 1 represents a fragmentary view of typical components of the dressing of this invention before final assembly and fenestration.

Fig. 2 illustrates a representative dressing of this invention.

Fig. 3 illustrates a cross-sectional view taken along line 3—3 of Fig. 2.

Fig. 4 illustrates a modification of the dressing in which the bonding of the components is intermittent.

Fig. 5 represents a cross-sectional view taken along line 5—5 of Fig. 4.

Fig. 6 represents a modification of the film fenestrations of the dressing of this invention.

It is believed that the theory of dressing functionality as accepted prior to the introduction of the dressings of this invention has been partially erroneous and inadequate in that it has permitted the formation of thick eschars. Such thick dried eschars have caused conventional dressings to perform unsatisfactorily during their removal from wounds. We have found that smooth lubricous film surfaces are ideal contact surfaces for wounds when properly used as combined in our completely new type of wound dressing with its wholly unique functionality.

Prior to the introduction of the dressings of this invention, no one had realized the advantages of a substantially skin-thick eschar nor had any dressing been constructed or proposed which would give such a skin-like eschar.

We have discovered that real non-adherence of surgical dressings to wounds is a result of this wholly new concept of dressing functionality whereby the wound is kept essentially dry, the exudate being drawn and conducted away from the wound, where it is absorbed as fast as it forms. Wounds dressed with dressings having this functionality develop a very thin skin-like eschar which is generally slightly moist until after the dressing is removed. Removal of such dressings is accomplished without disruption of the eschar skin.

The composite dressing which we have discovered, having the desired functionality of forming thin wound eschars from which the dressing may be removed without eschar disruption, has two essential elements, a specific particularly fenestrated lubricous film and a sheet-like absorbent material having a certain minimum capillarity. The two sheet elements may be surface united either with or without heat by sealing through activation of adhesive properties of either or both elements or of a selected interposed adhesive so that bonds exist between the fenestrations in the film.

Referring now to the drawings, in Fig. 1 the film portion 12 is shown in the imperforate condition with the bonding layer 14 covering the top surface and with the absorbent backing material 10, superimposed.

In Fig. 2 the assembled dressing is shown after the fenestrations 16 have been made in the film. In the modification shown in Figs. 4 and 5, the bonding layer is not continuous but rather intermittent as indicated by 22. The holes in the film 18 may be somewhat compartmented as at 20 but preferably they are uniformly distributed over the entire film area. In Fig. 6, the film component 24, is shown with a pattern perforation of circular holes as contrasted to the irregular fenestrations shown in Fig. 2.

It is highly important that an intimate and essentially non-displaceable or permanent contact between the selected film and the proper absorbent backing exist between the openings if the desired functionality is to be obtained in the finished dressing. We have found that unification throughout the surface area of contact is highly desirable but that the dressing will still perform its function in a satisfactory manner without such complete unification if substantial bonding exists between the fenestrations in the film. Unification of the absorbent backing to the film between the openings permanently maintains the exposed fibers underlying said openings in close proximity to the plane of the film and permanently in position for capillary attraction of body wound exudates at the plane of the sheet.

The film must be smooth and lubricous and should also present a continuous surface without appreciable roughness or graininess. Roughly surfaced or discontinuous mediums are abrasive and tend to produce rough uneven eschars which are easily abraded. The film should be relatively thin of the order of ten thousandths of an inch thick or less and preferably of the order of .00025 inch. Where the film is too thick or non-conformable, particularly with films having high liquid contact angles, the dressing tends to perform improperly or inefficiently.

The film, in addition to thinness, must possess a high degree of conformability. We have found that where a strip of film, cut either way from the sheet, one inch (½ inch nominal) by two inches is tested on the Gurley R.D. Stiffness Tester 4171 by bending across the two inch width, only those films which require 12 grams or less of force to bend them have the necessary pliability and conformability for the bandages of this invention. Obviously, if the film is too stiff it will be uncomfortable but, in addition, it will fail to conform to the body sufficiently to create thin eschars.

Another limitation upon the film utilized is the ratio of dry to wet initial modulus of elasticity. Where this ratio approaches the order of 100 to 1, we find that the film is distorted by moisture after application to the point it no longer presents a smooth lubricous surface and hence is no longer suitable for the dressings of this invention.

One of the most desirable features of a surgical dressing is its ability to withstand normal hospital sterilization which is essentially a heat process. Films which are to be used in dressings undergoing such sterilization must be capable of withstanding exposure to saturated steam at 240° F. and 12 pounds pressure for 15 minutes without deterioration and without shrinking more than 6% in any direction. Films capable of such conventional hospital sterilization are greatly preferred for the dressings of this invention.

The film should be non-toxic, of course, that is, it should contain no primary irritants nor active sensitizers nor delay wound healing either in itself or because of any leachable ingredient. In general, the film should be completely insoluble in wound exudate with the exception that under certain conditions it may be desirable to incorporate in the film certain leachable medicaments.

Our preferred film is a preformed single thickness of extruded .00025 inch thick polyethylene terephthalate which may be prepared by any of the known processes such as that described in Patent No. 2,650,213. A commercially available film which may not be completely polyethylene terephthalate but is perfectly satisfactory may be obtained from E. I. du Pont de Nemours & Company, Wilmington 98, Delaware, under the trademark "Mylar." This film in the preferred caliper is sufficiently pliable without modification for the dressings of this invention. In some cases, with films not of extreme thinness, it may be desirable to plasticize the film to obtain sufficient flexibility, softness and conformability.

Obviously, where plasticizers are utilized they should be non-toxic. Practically all plasticizers used in commercially obtainable films are satisfactory in this particular. Where a cement is to be used in uniting the film and the absorbent backing, particularly when the cement contains substantial amounts of rubber, we prefer to use a non-migratory plasticizer preferably of the polymeric type such as the oil modified polyesters of sebacic acid and other polybasic acids or other modified or unmodified polymerized condensation products of a polyhydric alcohol and a polybasic acid.

In general, where the film is such that it may be melted sufficiently for heat-sealing at a temperature below the scorch point of the absorbent backing, we prefer to unite or bond the film and the absorbent backing by pressure heat-sealing methods. Where the films themselves are not capable of being heat-sealed under such conditions they may be coated with various heat seal coatings which permit this method of unification of the dressing to be utilized. But it may be expedient to utilize a quick drying cement for uniting the film and the absorbent backing.

The cement chosen may or may not be pressure-sensitive but it must be water-resistant or water-insoluble, non-toxic and flexible when dry. It should be capable of firmly bonding the specific film to the absorbent backing. Cements which are to be utilized for heat-sterilizable dressings must be capable of withstanding such heats without deterioration and must have such non-flow characteristics both when at room temperature and when heated as not to reduce the porosity of the film below the minimum for dressings of this invention. Cements for bonding specific films are well known, examples of which with the specific films for which we have found them satisfactory are indicated in Table I. Also indicated in this table are the heat-sealability and steam sterilizability of the listed films, a + sign indicating that the particular film has the particular property.

A special type of cement bonding may be preferred where the film utilized is solvent cast upon a moving surface to which the film is detachably adherent. At a point in the drying sequence, the film becomes quite firm with its surface still tacky. At this point the absorbent backing may be pressed against the tacky film firmly to unite the two. This same procedure may be used where the film having a melting point below the scorch point of the backing is hot melt spread or extruded upon a chilled surface with the absorbent backing applied at the proper time to the exposed molten surface of the film.

Table I

| Film | Heat Sealability | Steam Sterilizability | Cement Formula |
|---|---|---|---|
| Cellophane | | + | A or B |
| Cellophane (moisture proof) | | + | A or B |
| Cellulose acetate | + | + | A or C |
| Ethyl cellulose | + | | C |
| Cellulose acetate-butyrate | + | | A |
| Polyvinyl chloride | + | + | D |
| Vinyl chloride-acetate copolymer plasticized with 20% dioctyl phthalate | + | | D |
| Vinyl chloride-acrylonitrile copolymer | + | | C |
| Vinyl chloride-vinylidine chloride copolymer | | + | A |
| Vinyl chloride-octylacrylate copolymer | + | | C |
| Polyamide (alcohol soluble) | | + | A |
| Polyvinyl butyral | + | | B |
| Polyethylene | + | | E |
| Vinyl acetate-crotonic acid plasticized with 20% dibutyl phthalate | | | C |
| Polyethylene terephthalate | | + | A |

Suitable cements as indicated in Table I are as follows:

FORMULA A

Parts by weight

Solution x—
Polyvinylethyl ether _____ 13.4
Toluene _____ 76.2
Solution y—
Water _____ 10.3
70% aqueous solution wetting agent (Aerosol OT) _____ 0.09
Methyl cellulose _____ 0.001
Add Solution x to Solution y with rapid stirring.

FORMULA B

Parts by weight

Milled pale crepe rubber _____ 350
High molecular weight polyisobutylene _____ 200
Glycerol ester of hydrogenated rosin _____ 350
Low molecular weight polyisobutylene _____ 100
Rubber antioxidant _____ 3
Heptane _____ 2500

FORMULA C

Parts by weight

55% solids polyvinyl acetate emulsion _____ 100
Dibutyl phthalate _____ 30
Water _____ 20

FORMULA D

Parts by weight

Neoprene latex 601A _____ 100
Geon polyblend latex 552 (A dispersion of a blend of polyvinyl chloride and butadieneacrylonitrile copolymer) _____ 100

FORMULA E

Parts by weight

Milled pale crepe rubber _____ 76.5
Glyceryl ester of hydrogenated rosin _____ 76.5
Zinc oxide _____ 56.5
Titanium dioxide _____ 14.5
Antioxidant _____ 1.0
Heptane _____ 540.0

Where a cement is utilized, we prefer to spread it as thinly as possible, consistent with firm bonding. The optimum dried thickness is in the range of about .0002 to .0006 inch with the wet thickness varying inversely with solids content.

The absorbent backings for the dressings of this invention must have a capillarity sufficient to take up and retain a minimum weight of water equal to four times the weight of the backing as determined by the Absorbency Test for Purified Cotton set out on page 678 of the fourteenth revision of the Pharmacopoeia of the United States. We prefer sheeted non-woven fibrous absorbent material such as is described in U. S. Patent No. 2,277,049, No. 2,528,793 or No. 2,625,733, particularly the cotton felts described in the latter two patents, or absorbent cellulose sheeted wadding made from wood pulp such as is sold under the trademark "Cellucotton" by International Cellucotton Products Co. Such sheeted absorbent material is preferred because it affords a more uniform coverage over the fenestrations in the film and hence presents a fairly uniform absorbent capacity throughout the area of the dressing.

Other absorbent materials both fibrous and cellular, such as woven and knitted fabrics, flocking, cotton and absorbent sponge material may be utilized, but in general are less satisfactory than the preferred highly absorbent backings. Where gauze is utilized, we prefer that it be as fine as 32 x 28 for the film contacting layer. Gauze as coarse as 20 x 12 is unsatisfactory for the film contacting layer but may be used for other layers.

In the layer of absorbent backing in immediate contact with the fenestrations in the films of the dressings of this invention, capillarity is very important. We have found that materials which when submitted to the above mentioned Pharmacopoeia test require more than 30 seconds for complete submersion are not suitable for this film contacting layer. Fibrous absorbent cellulosic sheet backings, the density of which are less than .05 gram per cubic centimeter, are also generally unsuitable. We have found that a 30 square centimeter piece of film pierced with holes to give an open area of .25% and having individual openings of the order of .125 mm. diameter will not in sixty seconds pass any appreciable water into a vented vessel when subjected to a head of 1" of water. Yet the same film, when backed with a typical cotton felt backing and constituting a dressing of this invention, will pass through the film and the backing behind it approximately 125 grams of water under the same conditions.

The dressings of this invention may be sterilized if desired by electronic sterilization or by the now well known gaseous methods such as with gaseous formaldehyde or by using various alkylene oxides such as ethylene oxide, either alone or in dilution with certain fire-suppressive gases such as carbon dioxide. Any film which may be heat or heat and steam sterilized, may also be sterilized by such gaseous methods. In addition, such relatively low temperature gaseous sterilization methods permit the use of a great many films which either have too low melting points to withstand heat sterilization temperatures or which are deteriorated by such heats. Examples of films which may be satisfactorily used when gaseous sterilization is employed are all of those appearing in Table I.

In general, we prefer to unite the film portion of the dressings of this invention in an imperforate condition to the absorbent backing and thereafter to make the openings in the films by one of several methods.

Perhaps the most practical method of making the otherwise finished dressing porous is to punch holes from the film side by means of rolls studded with piercing pins such as the pins on a cotton card. When a cushion roll is used on the absorbent backing side of the dressing, quite irregular holes, slits, minor tears and punctures are produced, but dressings so perforated are entirely satisfactory both from the functional and commercial appearance standpoint. We prefer to punch holes with a plurality of different size pins and have found that using two rolls having about 230 triangular, pyramidal pins per square inch, each pin being about .030" high and having a triangular base with an altitude of about .025" and a base of about .014" and four rolls having about 56 triangular pyramidal pins per square inch, each pin being about .045" high and having a triangular base with an altitude of about .045" and a base of about .030", an excellent dressing may be produced.

Proper porosity may also be imparted to the film after unification of the dressing by means of knife bearing rolls which slit the film intermittently or porosity may be obtained by means of high frequency electrical sparking.

Where the fenestration of the film is to be done prior to unification of the dressing it is quite feasible to perforate the film with a well defined pattern of perforations similar to but usually smaller than the perforations in postage stamps. One must be particularly careful, however, especially with very small perforations, to avoid filling the perforations with laminating cement if that method of unification is used.

Proper porosity in films may also be obtained by a great many other methods such as froth casting, casting with removable suspended particles, air-jet piercing and the like.

We have found the interrelated size, number and distribution of film holes or slits to be extremely important for the proper functioning of the dressings of this invention. It is obvious that the holes must be of such size and number as to pass at least a minimum of wound exudate. In general, we have found that film holes of about .2 mm. diameter spaced approximately .75 mm. apart impart excellent functionality to dressings otherwise properly constructed. Generally we have found an open area of less than .25% of the film area to be inadequate for proper drainage whether distributed over the film area as numerous small holes or as relatively fewer larger holes. Holes smaller than .01 sq. mm. tend to be inadequate.

At the other extreme are films having fenestrations of such size that the dressings made from them can no longer be considered truly non-adherent. We have found that where there are numerous holes in which a 5 mm. circle may be inscribed, sticking of the absorbent backing to the wound through the holes, is very probable. But where there is a maximum of 10% or less of holes in which circles greater than 2 mm. and up to 5 mm. may be inscribed and the remainder of the holes are of such size that only circles having diameters less than 2 mm. may be inscribed, the dressing will substantially retain its non-adherent character.

The films listed in Table I in calipers ranging from .00025 inch to .002 inch were spread with the cements indicated opposite them in wet thickness up to .0015 inch. While the spread coatings were still tacky, absorbent backings of cotton felt, flannel, 44/40 mesh gauze and wood cellulose sheet wadding all in thicknesses from about .002 to .25 inch were spread over the cement coatings. After drying, the dressings were fenestrated by localized heating and by passing through card cloth covered rollers to give openings ranging non-uniformly from .0125 square mm. to 12 square mm. and open areas from .25 to 25%. Similar films indicated in Table I as heat-sealable were run with the same backings through heat seal rollers which produced both over-all surface sealing and fine mesh pattern heat sealing. These heat-sealed dressings were fenestrated in the same manner as the cement unified dressings. Similar films were first fenestrated and then heat-sealed to the absorbent backings. Samples of all of the dressings were sterilized by subjecting them to a mixture of 10% ethylene oxide and 90% carbon dioxide at a temperature of 80° F. for 6 hours. Additional samples indicated in Table I as being steam sterilizable were sterilized with saturated steam at 240° F. and 12 pounds pressure for 15 minutes. All of the dressings withstood sterilization without appreciable damage. All proved satisfactory as non-adherent dressings within their respective capacities as reflected by their respective thicknesses although those with the preferred cotton felt and wood cellulose sheet wadding appeared to be most desirable from a performance standpoint.

Proof of the effectiveness of the dressings of this invention is to be found first in the results of carefully controlled animal experiments and, secondly, in the findings of exhaustive clinical tests carried out on human surgical wounds.

The first animal experiments demonstrate dramatically the superiority, in the all-important quality of non-adherence, of the dressings of this invention compared to the two leading dressings in use today.

In these extensive experiments, similar paired like wounds placed symmetrically on opposite sides of each animal were dressed on one side with the dressings of this invention and on the other side with plain gauze and petrolatum coated gauze respectively. The dressings were removed after 7 days with comparative adherence as summarized in Table II.

Table II

| Dressing | Percent of Wounds in Which Adherence Occurred After 7 Days |
| --- | --- |
| Gauze | 93 |
| Petrolatum Coated Gauze | 26 |
| Dressings of This Invention | 0 |

While none of the wounds dressed with the dressings of this invention showed adherence, sticking and disruption, such did occur in 93% of wounds dressed with plain gauze, and in 26% of wounds dressed with petrolatum gauze.

The results of a second series of studies carried out on experimentally produced wounds demonstrates the superior—and very surprising—healing obtained in like wounds covered with the dressings of this invention.

Experimental wounds dressed with the dressings of this invention were microscopically compared, by a recognized authority on microscopic anatomy, after 14 days without prior dressing removal, with like wounds symmetrically placed on the same animals dressed respectively with gauze and petrolatum coated gauze. On fifteen rabbits tested, the dressings of this invention left wounds all of which showed advanced healing over those dressed with plain gauze. On another set of fifteen rabbits with like wounds dressed with petrolatum coated gauze and the dressings of this invention, wounds dressed with the latter showed healing to be farther advanced in twelve of the fifteen pairs.

The results of clinical trial furnishes the final proof of the remarkable effectiveness of the dressings of this invention. Human wounds dressed with the dressings of this invention have good color and present a clean appearance with a very thin slightly moist skin-like covering which quickly dries if the dressing is not replaced. At the time of writing this specification, nearly a thousand diverse cases of major and of minor surgery, the latter mostly severe traumatic wounds of the extremities, were dressed with the dressings of this invention and graded on lack of adherence, adequate absorption and non-interference with wound healing. All but eight of the performances in this clinical evaluation of the dressings of this invention were classified as "excellent" in all categories.

Although our invention is primarily useful in the treatment of wounds and burns, we have also found it useful in connection with the absorption of urine, menstruum and other liquid exudates of the body from whatever cause whether or not the discharge is such as to permit a hardened film to be formed upon the body.

The invention, in addition to the form of a surgical dressing, therefore, may take other forms such as the form of a sanitary napkin or diaper.

We claim:

1. A sterilizable, unitary, non-adherent dressing for an animal body wound comprising a layer of water-insoluble absorbent material composed preponderantly of a mass of individual discrete fibers providing inter-fiber capillarity and a layer of a preformed sheet of smooth, conformable, lubricous, water-insoluble, substantially non-absorbent, organic film, said film having openings therethrough through which body wound exudates may pass into said absorbent material and being water-inseparable adherently united to said absorbent layer at points between said openings to obtain an intimate and essentially permanent contact between said film and said absorbent layer between said openings close to the plane of said sheet and permanently in position for capillary attraction of body wound exudates at said plane, said dressings being non-toxic and conformable at body temperature when air-dry.

2. The dressing of claim 1 in which the film is substantially polyethylene terephthalate.

3. The dressing of claim 1 in which the absorbent layer is cotton felt having a density greater than .05 gram per cubic centimeter.

4. The dressing of claim 1 in which the absorbent material is cellulose sheeted wadding.

5. The dressing of claim 1 in which the film surface contacting the absorbent layer forms the bond by which the film and absorbent layer are united.

6. The dressing of claim 1 in which the film and absorbent layer are adhesively united by a flexible water-insoluble cement.

References Cited in the file of this patent

UNITED STATES PATENTS

| | | |
|---|---|---|
| 2,650,213 | Hofrichter | Aug. 25, 1953 |

FOREIGN PATENTS

| | | |
|---|---|---|
| 439,085 | Great Britain | Nov. 28, 1935 |
| 448,742 | Great Britain | June 15, 1936 |
| 511,166 | Great Britain | 1939 |